Patented Dec. 12, 1939

2,183,516

UNITED STATES PATENT OFFICE 2,183,516

EGG MATERIAL TREATMENT

Leon D. Mink, Chicago, Ill., assignor to Industrial Patents Corporation, Chicago, Ill., a corporation of Delaware No Drawing. Application June 14, 1939,
Serial No. 279,117

28 Claims. (Cl. 99—210)

The present invention relates to the improvement of the whipping qualities of eggs.

One of the objects of the invention is to provide an improved dried egg product which may be readily reconstituted upon the addition of water.

Another object of the invention is to provide an improved dried egg product which upon the addition of water is reconstituted and whipped to a relatively low apparent specific gravity.

Other objects of the invention will be apparent from the description and claims which follow.

This application is a continuation in part of my application entitled Egg material treatment, Serial No. 141,377, filed May 7, 1937, which application is a division of my application entitled Reconstitution of dried egg material, Serial No. 117,540, filed December 24, 1936.

I have discovered that the addition of surface active agents to egg whites, egg yolks, or whole eggs before or after drying renders the egg material readily reconstitutable and endows it with greatly improved whipping properties. The present invention contemplates the employment of substances which may be classed as surface active agents.

Surface active agents may be classified into nine groups, as follows:

| Description | Formula |
| --- | --- |
| Soaps | R—COOM |
| Fatty alcohol or higher alcohol sulphonates | R—SO$_2$OM |
| Fatty alcohol or higher alcohol sulphates | R—SO$_3$OM |
| Secondary alcohol sulphates | (R')$_2$—CHSO$_3$OM |
| Sulphated fatty acid esters | R—COOC$_2$H$_4$SO$_3$OM |
| Sulphated fatty acid amides | R—CONHC$_2$H$_4$SO$_3$OM |
| Alkylaryl sulphonates | R'—Ar—SO$_2$OM |
| Sulphated esters of higher alcohols and dibasic acids | R'—OOC—CH$_2$<br>R'—OOC—C-SO$_3$OM<br>H |
| Sulphonated esters of alcohols and dibasic acids | R'—OOC—CH$_2$<br>R'—OOC—C-SO$_2$OM<br>H |

R designates a suitable alkyl group. R' designates a primary or secondary alkyl group. Ar designates an aryl or aromatic group. M designates a suitable metal.

Soaps which are satisfactory for the purposes of my invention are sodium or potassium laurate, stearate, and palmitate.

A fatty alcohol sulphonate which is satisfactory for the purposes of my invention is the commercial product known as "Penetrator X."

Fatty alcohol sulphates which are satisfactory for the purposes of my invention are sodium lauryl sulphate, sodium stearyl sulphate, and sodium palmityl sulphate, and the commercial products known as "Dreft," "Drene," "Duponol," and "Gardinol."

A secondary alcohol sulphate which is satisfactory for the purposes of my invention is the commercial product known as "Tergitol Penetrant."

A sulphated fatty acid ester which is satisfactory for the purposes of my invention is the commercial product known as "Wetanol."

Sulphated fatty acid amides which are satisfactory for the purposes of my invention are the commercial products known as "Igepon T" and "Intramine," which is a sodium salt of sulphonated lauryl and myristyl colamide.

Examples of alkylaryl sulphonates which are satisfactory for the purposes of my invention are the commercial products known as "Aerosol OS," "Nacconol," and "Santomerse."

Examples of sulphonated esters of alcohols and dibasic acids which are satisfactory for the purposes of my invention are the commercial products known as "Aerosol OT," "Betasol OT-A," and "Deceresol OT."

It will be readily appreciated that the particular surface active agent which is employed in practicing my invention will be selected according to the uses to which the final product is to be put. In the case of edible products, it is apparent that the surface active agent selected will be one which is edible or which may be taken internally without adverse effects. In the case of products which are to be used for inedible purposes, the surface active agent may be a toxic or poisonous agent.

It will also be appreciated that the quantity of surface active agent which is added to the egg material will depend upon the activity of the particular agent.

In preparing or reconstituting dried egg material for edible purposes I prefer to employ sulphated or sulphonated long chain or fatty alcohols. It is well known that sulphated and sulphonated long chain alcohols can be prepared from a number of vegetable and animal oils of suitable molecular weight. In carrying out the present invention the saturated alcohols of the range C$_{10}$ to C$_{14}$ prepared from cocoanut or palm kernel oils have been found to be very effective. Examples of fatty alcohol sulphates which are water soluble and, therefore, convenient to use in a water solution are sodium lauryl sulphate, sodium stearyl sulphate, and sodium palmityl sulphate.

For a better understanding of my invention it will be illustrated by describing the method of reconstituting dried egg material by the use of sodium lauryl sulphate. It will be appreciated that the other surface active agents may be employed in the same manner as described for sodium lauryl sulphate, the particular quantities of the various agents being dependent upon their activity.

In carrying out the method of the present invention with respect to egg whites, small quantities of sodium lauryl sulphate, for example, from 0.1 per cent to 0.3 per cent calculated on the basis of the solids in normal egg whites, may be added to the egg whites in the liquid state. The egg whites are then dried in any suitable manner, as, for example, in accordance with the process described and claimed in my copending application entitled Treatment of egg whites, Serial No. 37,375, filed August 22, 1935.

In whipping tests made on dried egg whites reconstituted to the original solids basis by the addition of water, I have secured the following results by the addition of sodium lauryl sulphate in the quantities indicated in Table A.

Table A

| | Specific gravity after— | |
| --- | --- | --- |
| | 2-minute whip | 4-minute whip |
| Control sample | 0.142 | 0.125 |
| 0.10% sodium lauryl sulphate | 0.136 | 0.114 |
| 0.20% sodium lauryl sulphate | 0.130 | 0.109 |
| 0.30% sodium lauryl sulphate | 0.109 | 0.098 |

Large quantities of dried egg whites and dried egg yolks are employed in the bakery trade and for other purposes. The chief difficulty with the employment of dried egg material in the bakery trade resides in the difficulty with which dried egg material is reconstituted and the failure of dried egg material upon reconstitution to provide as high a volume as can be secured by whipping normal egg material or defrosted frozen egg material.

In the manufacture of angel cakes and products of that type, it is important that the egg whites have a maximum foaming power. Similarly, in the manufacture of sponge cakes, it is important that the egg yolks employed have a maximum foaming power. To some extent the foaming power is important in the manufacture of many cakes in which whole eggs are employed.

It will be understood, of course, that the term "whole eggs" is used herein to designate a mixture of yolks and whites which have been removed from the shells.

The foam obtained upon the whipping of reconstituted dried egg material prepared in accordance with the present invention has an increased volume and is a more stable foam than can be otherwise secured.

The fatty alcohol sulphates employed in the present invention may be prepared by the reduction of the fatty acid radical of various fatty materials by high pressure and catalytic hydrogenation with the formation of the corresponding alcohols which are then sulphated. The sulphonated alcohols may be prepared in a similar manner. The alkyl sulphonic acid or alkyl sulphuric acid is then neutralized to form the salt of the acid.

It will be understood that in addition to the sodium salts any suitable salt may be employed, for example, a potassium salt. Similarly, in preparing the sulphated alcohols or sulphonated alcohols any suitable fatty acid or ester may be employed in the preparation of the foaming agent, for example, lauric acid, oleic acid, stearic acid, and palmitic acid. The alkylaryl sulphonate and the sulphonated esters of alcohols and dibasic acids have also been found to be very satisfactory for the purposes of my invention.

I claim:
1. An egg product consisting essentially of dried egg material and a surface active agent.
2. An egg product consisting essentially of dried egg whites and a surface active agent.
3. An egg product consisting essentially of dried egg yolks and a surface active agent.
4. An egg product consisting essentially of dried egg material and a higher alcohol sulphate.
5. An egg product consisting essentially of dried egg material and an alkylaryl sulphonate.
6. An egg product consisting essentially of dried egg material and a sulphonated ester of alcohols and dibasic acids.
7. An egg product consisting essentially of dried egg material and an alkaline metal salt of sulphated higher primary normal alcohols.
8. An egg product consisting essentially of dried egg whites and an alkaline metal salt of sulphated higher primary normal alcohols.
9. An egg product consisting essentially of dried egg yolks and an alkaline metal salt of sulphated higher primary normal alcohols.
10. An egg product consisting essentially of dried egg material and sodium lauryl sulphate.
11. An egg product consisting essentially of dried egg material and sodium stearyl sulphate.
12. An egg product consisting essentially of dried egg material and sodium palmityl sulphate.
13. An egg product consisting essentially of dried egg material and from 0.1 per cent to 0.3 per cent sodium lauryl sulphate.
14. An egg product consisting essentially of dried egg material and from 0.1 per cent to 0.3 per cent sodium stearyl sulphate.
15. An egg product consisting essentially of dried egg material and from 0.1 per cent to 0.3 per cent sodium palmityl sulphate.
16. The method of preparing egg material which comprises adding to egg material a surface active agent and thereafter drying the egg material.
17. The method of preparing egg material which comprises adding to egg material a higher alcohol sulphate and thereafter drying the egg material.
18. The method of preparing egg material which comprises adding to egg material an alkylaryl sulphonate and thereafter drying the egg material.
19. The method of preparing egg material which comprises adding to egg material a sulphonated ester of alcohols and dibasic acids and thereafter drying the egg material.
20. The method of preparing egg material which comprises adding to egg material an alkaline metal salt of sulphated higher primary normal alcohols and thereafter drying the egg material.
21. The method of preparing egg material which comprises adding to egg whites an alkaline metal salt of sulphated higher primary normal alcohols and thereafter drying the egg whites.
22. The method of preparing egg material which comprises adding to egg yolks an alkaline metal salt of sulphated higher primary normal alcohols and thereafter drying the egg yolks.

23. The method of preparing egg material which comprises adding to egg material sodium lauryl sulphate and thereafter drying the egg material.

24. The method of preparing egg material which comprises adding to egg material sodium stearyl sulphate and thereafter drying the egg material.

25. The method of preparing egg material which comprises adding to egg material sodium palmityl sulphate and thereafter drying the egg material.

26. The method of preparing egg material which comprises adding to egg material from 0.1 per cent to 0.3 per cent sodium lauryl sulphate, and thereafter drying the egg material.

27. The method of preparing egg material which comprises adding to egg material from 0.1 per cent to 0.3 per cent sodium stearyl sulphate, and thereafter drying the egg material.

28. The method of preparing egg material which comprises adding to egg material from 0.1 per cent to 0.3 per cent sodium palmityl sulphate, and thereafter drying the egg material.

LEON D. MINK.